United States Patent [19]

Yamanaka et al.

[11] 4,131,913
[45] Dec. 26, 1978

[54] SOLID STATE TELEVISION CAMERA

[75] Inventors: Seisuke Yamanaka, Mitaka; Fumio Nagumo, Yokahama; Toshimichi Nishimura, Tama, all of Japan

[73] Assignee: Sony Corporation, Tokyo, Japan

[21] Appl. No.: 831,341

[22] Filed: Sep. 7, 1977

[30] Foreign Application Priority Data

Sep. 10, 1976 [JP] Japan .................... 51-108539

[51] Int. Cl.² .................... H04N 9/04
[52] U.S. Cl. .................... 358/44
[58] Field of Search .................... 358/41, 44

[56] References Cited
U.S. PATENT DOCUMENTS 3,982,274  9/1976  Chai .................... 358/41
4,071,853  1/1978  Yamanaka .................... 358/41

Primary Examiner—Robert L. Richardson
Attorney, Agent, or Firm—Hill, Gross, Simpson, Van Santen, Steadman, Chiara & Simpson

[57] ABSTRACT

A solid state television camera having a solid state image sensing device and an optical color filter. The color separating characteristics of the color filter are so selected that when a predetermined horizontal scanning line is scanned the solid state image sensing device produces a standard red color signal and a luminance signal sequentially and alternately, and when an adjacent horizontal line is scanned, a blue color signal and luminance signal are produced in the same manner. In this way, different color difference output signals are simultaneously obtained at every horizontal scanning line, and based upon the color difference output signals and luminance signal, there is produced therefrom a standard color video signal.

6 Claims, 15 Drawing Figures

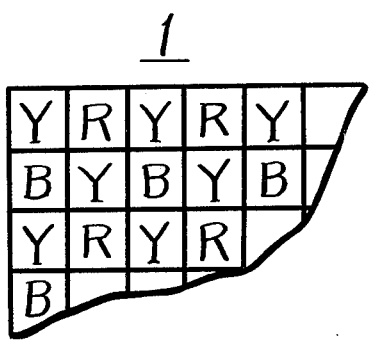
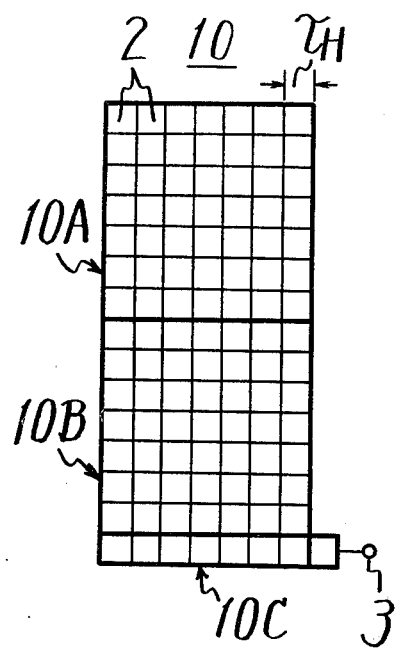
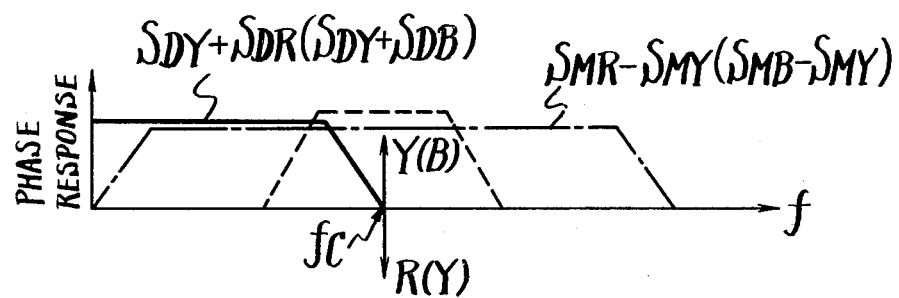

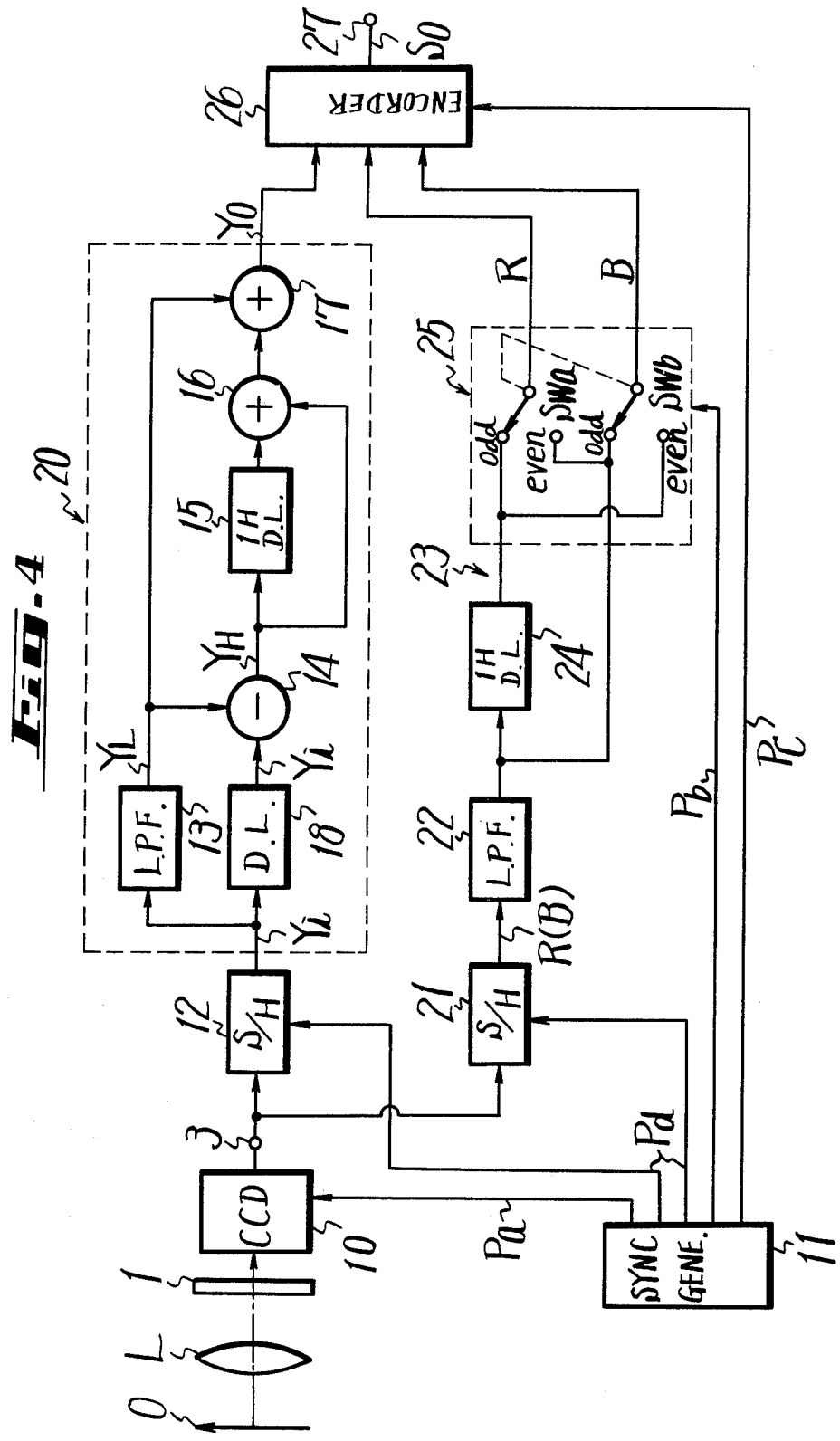

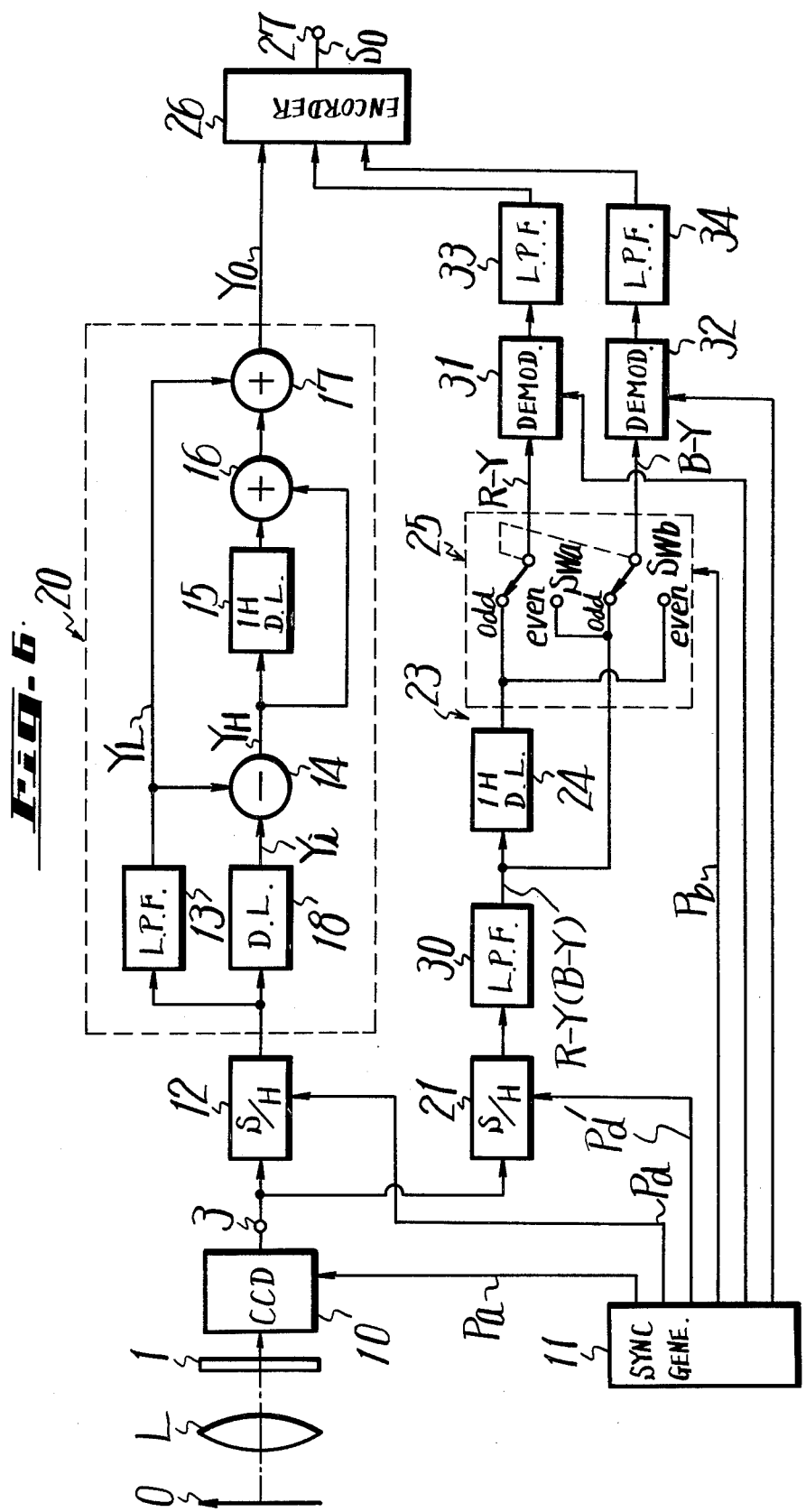

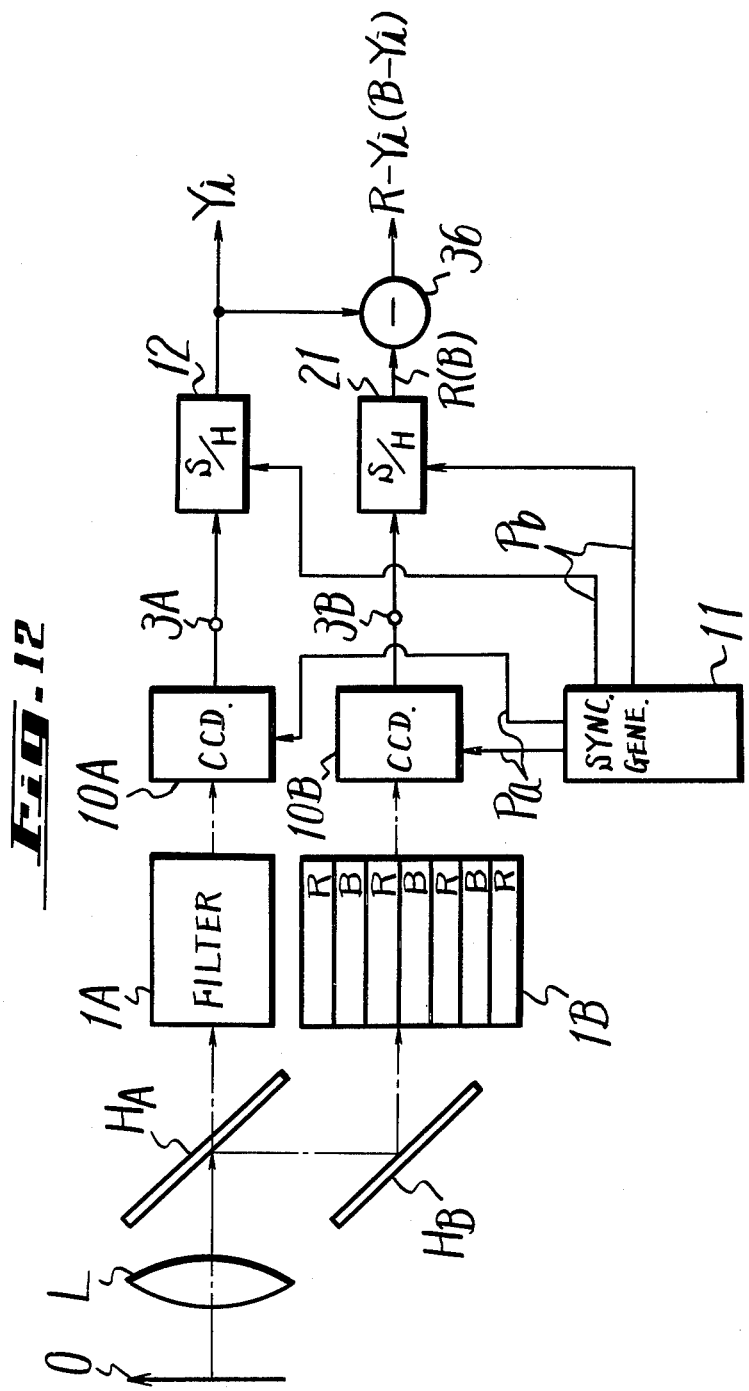

SOLID STATE TELEVISION CAMERA

BACKGROUND OF THE INVENTION

1. Field of the Invention

This invention relates generally to a solid state television camera, and is directed more particularly to a solid state color television camera in which color difference signals obtained from a spacial color filter in a line sequential manner are converted simultaneously to a standard color signal.

2. Description of the Prior Art

In the art there have been proposed various solid state color television cameras which use a semiconductor element such as a bucket brigade device (BBD), charge coupled device (CCD) or the like as its solid state image sensing device. Also, various color filters which are disposed at the front of the solid state image sensing device have been well known. One of the well known color filters, for example, a so-called double-green type filter, which includes a greater amount of the green color component to be more appealing to the eye than those of the other color components forming the luminance signal, is used to improve the resolution.

This double-green type color filter has a plurality of transparent or light transmissibility regions whose unit area corresponds to one picture element. In this case, the region corresponding to an odd horizontal scanning line is so selected that it contains the green color component G twice as compared with the red and blue color components R and B. For example, the transparent regions of G, R and B are arranged in a horizontal scanning line in the order of G-R-G-B which is repeated sequentially.

For an even horizontal scanning line, due to the signal process described later, the position of the transparent regions are so selected that the green color component G is reversed in phase with respect to the odd horizontal scanning line.

Accordingly, when an object is picked up by a camera using the above filter, the spectra and phase relation of the respective color components become as follows.

If the sampling frequency in the horizontal scanning direction is selected as $f_C$, and the band of the green color component G is selected at a sampling frequency $f_C$ of 4.5 MHz, the sampling output relating to the green signal includes, in addition to a modulating signal component (DC components or base band components) $S_{DG}$, a side band component (AC component) $S_{MG}$ whose carrier is the sampling frequency $f_C$. If sampling frequency $f_C$ is about 4.5 MHz as set forth above, the relationship of the signal bands becomes such that side band component $S_{MG}$ is mixed into modulating signal component $S_{DG}$ to cause a sampling error. This sampling error caused by side band component $S_{MG}$ deteriorates the reproduced picture. The sampling error is removed by utilizing the vertical correlation process. That is, since the phases of carriers obtained from adjacent horizontal scanning lines are opposite, the sampling error can be removed by vertical correlation.

The carriers of the respective red color component R and blue color component B are just one-half that of the green color component G, so that in the case of the green component G, side band components cannot be removed by the vertical correlation process since the phases of the carriers are not opposite.

It is difficult to limit the pass band of only a desired color signal by an optical device, that is, to form an optical low pass filter for the purpose of removing the undesirable effects of the side band components.

SUMMARY OF THE INVENTION

Accordingly, an object of the present invention is to provide a solid state color television camera free from the defect of the prior art.

Another object of the invention is to provide a solid state color television camera in which flicker in the reproduced picture due to sampling error caused by sampling the output of a solid state image sensing device is avoided.

A further object of the invention is to provide a solid state color television camera wherein even without vertical correlation in the case of a black-and-white image, the picture is reproduced without color and hence any deterioration of the reproduced picture is avoided.

According to an aspect of the present invention there is provided a solid state color television camera which comprises a solid state image sensing device including a plurality of individual light sensing units arranged in both horizontal and vertical rows; said solid state television camera comprising an optical device for establishing an image light path for projecting an image of an object on said image sensing device. A plurality of color filter elements are arranged in horizontal rows within said light path; said color filter elements having transmissibilities selected to pass therethrough a first primary color information and a luminance signal information succeedingly in a first horizontal line and to pass therethrough a second primary color information and a luminance signal information succeedingly in a second horizontal line. A circuit for developing a luminance image signal from each of said color filter elements and a circuit for developing first and second color difference signals from each of said color filter elements in response to respective row portions of an image displayed is provided. There is also a circuit for processing said first and second color difference signals into a desired color video signal to be mixed with the developed luminance image signal.

Other objects, features and advantages of the present invention will become apparent from the following description taken in conjunction with the accompanying drawings through which like reference numerals are used to designate a preferred embodiment.

BRIEF DESCRIPTION OF THE DRAWINGS

FIG. 3 is a partial front view of an optical color filter used in a prior art television camera and that of the invention;

FIG. 4 is a block diagram showing the circuit of a prior art solid state television camera;

FIG. 5 is a front view showing a solid state image sensing device used in the present invention;

FIG. 6 is a block diagram showing the circuit of the solid state color television camera according to the present invention;

FIG. 7 is a waveform diagram used for explaining the camera of the invention shown in FIG. 6;

FIGS. 8, 10, 11 and 12 are block diagrams showing other examples of the invention.

DESCRIPTION OF THE PREFERRED EMBODIMENTS

Figure 1:
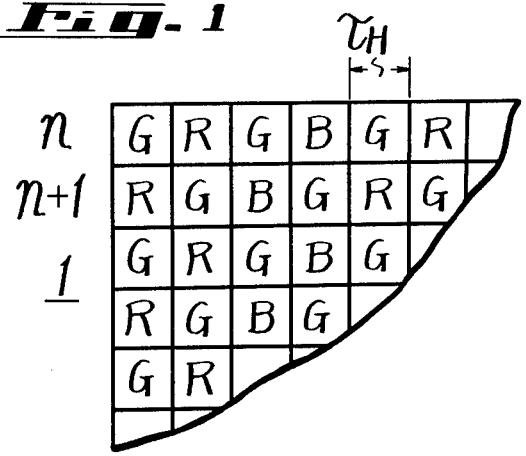
FIG. 1 is a partial front view of an optical color filter used for explaining the present invention.

In general, when an object is picked up by a television camera using a double green type color filter 1 shown in FIG. 1, the spectra and phase relation of the color signal components of the camera are shown in FIGS. 2A to 2D.

Figure 2A:
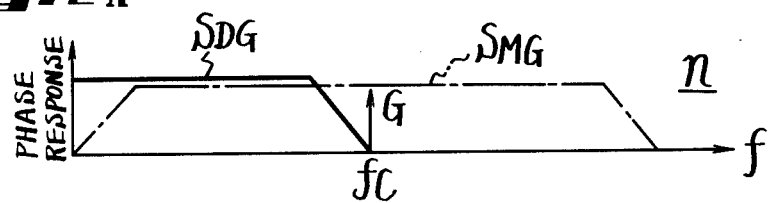
FIGS. 2A to 2D are waveform diagrams used for explaining the color filter shown in FIG. 1.
Figure 2B:
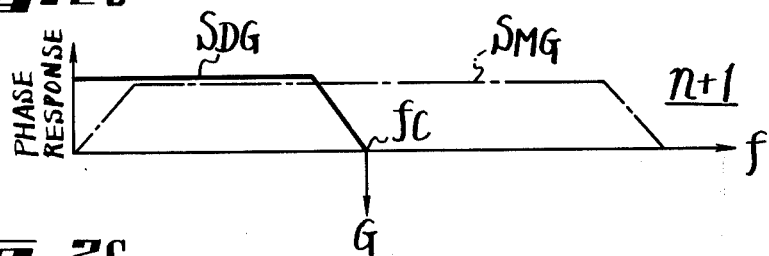

If it is assumed that the sampling frequency in the horizontal scanning direction is taken as $f_C$, and the band of a green color component G is selected as the sampling frequency $f_C$ (about 4.5 MH$_z$), the sampled output signal relating to the green color signal (for example, the color signal at the nth line) in the output signal from a solid state image sensing device includes, in addition to modulating signal components (DC components or base band components) $S_{DG}$, side band components (AC components) $S_{MG}$ whose carrier is at a sampling frequency $f_C$, as shown in FIG. 2A. If the sampling frequency $f_C$ is about 4.5 MH$_z$ as set forth above, the relation of the signal bands is as shown in FIG. 2A where side band components $S_{MG}$ are mixed into modulating signal components $S_{DG}$. Thus a sampling error is caused which will deteriorate the reproduced picture. In general, the sampling error is removed by utilizing the vertical correlation theory or process. That is, the phase of the carrier obtained from an adjacent horizontal scanning line (for example, the n+1 line) is opposite to that from the nth horizontal scanning line as may be apparent from FIG. 1, so that the output spectra shown in FIG. 2B is obtained from the n+1 scanning line. Thus, a so-called vertical correlation process to mix adjacent lines is carried out, and the sampling error is accordingly removed.

Figure 2C:
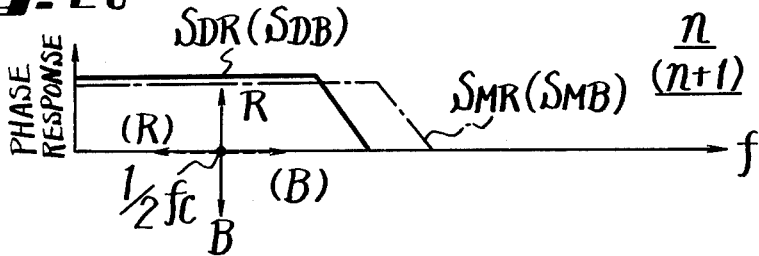

Since the respective carriers of the red component R and the blue component B are just one-half of the green component G, the relationship between the modulating signal components $S_{DR}$, $S_{DB}$ and side band components $S_{MR}$, $S_{MB}$, to the respective red and blue components R and B is shown in FIG. 2C. That is, the carrier of the red component R in a predetermined horizontal line is in opposed phase relation to the carrier of the blue component B, and the carriers of red and blue components in the succeeding line are also in opposed phase relation. In this case, although the red and blue components R and B are obtained from each horizontal scanning line, the successive same color signal information in the horizontal or line period are not in opposed phase relation (advanced by 90°) and hence it is impossible to remove side band components $S_{MR}$ ($S_{MB}$) by the vertical correlation process as in the case of green component G. In FIG. 2C, the color components at the n+1 line are designated by reference letters in parentheses.

If the level of the DC components mixed in the low band side of the side band components is sufficiently low as compared with that of the modulating signal components, there may occur no serious problem. However, if the carriers of components R and B are low, such as $\frac{1}{2}f_C$ as in the above example, the level ratio of the side band components mixed in the low band of the DC components is great, and accordingly the effect of the side band components on the reproduced picture cannot be neglected.

Figure 2D:
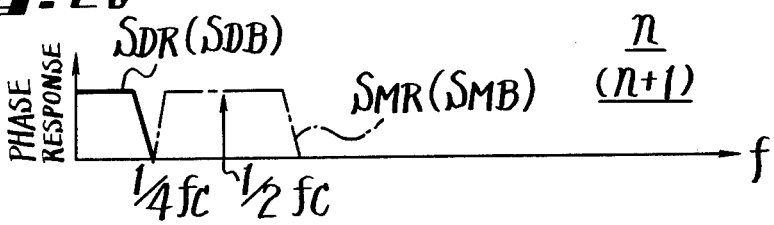

In order to remove the above effect on the reproduced picture, if the bands of the R and B components are lower than $\frac{1}{2}f_C$ due to optical means, the relation between the modulating and side band components becomes as shown in FIG. 2D where the side band component does not mix with the modulating component. However, it is not so easy to limit the pass band of an optically desired wave length or to provide an optical low pass filter of the wave length dependent type, as set forth above.

In order to remove or eliminate the above sampling error without using an above optical low pass filter, it may be considered that the light separation characteristic of the color filter 1, FIG. 3, is selected such that a light component Y, which is called the luminance signal in the standard system, is obtained from a desired transparent region. That is, in this color filter 1, the odd line is selected or formed of the transparent regions Y-R-Y-R . . . and the even line is formed of the transparent regions B-Y-B-Y . . . If the transparent regions Y are selected to be opposed in phase at every line, the luminance component Y becomes opposite in phase at every line. Thus, a sampling error due to the luminance component Y can be removed by the vertical correlation process as in the process of the green signal components in FIG. 1.

Since the carrier of components R and B have the same frequency as that of component Y, and their pass bands are not restricted, the relation between the modulating components and side band components in R and B become the same as that shown in FIG. 2A. As for the side band components relating to components R and B, vertical correlation cannot be utilized so that the side band components remain within the respective modulating components. However, the level of the side band components existing in the low band side of the modulating component under the remaining state shown in FIG. 2A is much lower than that of the prior art shown in FIG. 2C, and hence the effect of the remaining side band component on the reproduced picture presents no problem in practical use.

FIG. 4 shows the circuit of a television camera in which the color filter of FIG. 3 is used and a CCD chip of the frame transfer system shown in, for example, FIG. 5 is used as a solid state image sensing device 10. This solid state image sensing device or CCD 10 consists of an image sensing array 10A, which includes a plurality of image sensing cells, picture elements or light sensing units 2, arranged in rows and columns on which an image of an object O is projected through an optical lens system L and a color filter 1. A temporary storage array 10B, which stores the carried induced in response to the image of the object O, and a horizontal shift register 10C for reading out the stored carriers with an output terminal 3 is also shown.

The solid state image sensing device or CCD 10 is supplied with a driving pulse signal Pa from a synchronizing signal generator 11. This driving pulse Pa includes a plurality of pulses which are necessary to induce carriers in response to the image of the object O, transfer the carriers and read out the carriers, respectively. The luminance signal Y in the picked up output signal obtained at terminal 3 is subjected to the vertical correlation process. To this end, the output signal from terminal 3 is fed to a sampling hold circuit 12 and a luminance signal $Y_i$ read out from sampling hold circuit 12 is supplied to a vertical correlation process circuit 20. In the circuit of FIG. 4, in order to avoid deterioration of the resolution in the vertical direction, the low band component of the luminance signal $Y_i$ is not subject to the vertical correlation process except at its high band end. Accordingly, in the vertical correlation process circuit 20, luminance signal $Y_i$ is fed at first to a low pass filter 13 through which a low band component $Y_L$ about (500 to 1000 KH$_z$) of the luminance signal $Y_i$ is derived. Since the low band component $Y_L$ and luminance signal $Y_i$ are fed to a subtractor 14, this subtractor 14 produces only a high band component $Y_H$ of luminance signal $Y_i$. The high band component $Y_H$ is fed through a delay line or circuit 15 of 1H (H is the horizontal line period) to an adder 16 which is also supplied with component $Y_H$ which is not delayed.

Since the phase relation between the carriers of adjacent horizontal scanning lines is opposite, the side band components are cancelled by the above signal process. As a result, if the output signal from the adder 16 and low band component $Y_L$ are supplied to a next stage of an adder 17, this adder 17 produces a luminance signal $Y_O$, from which the side band components are removed. A delay line or circuit 18 is provided at the input side of the subtractor 14 which serves to correct the inconsistency of the transmission time caused by the time delay of the low pass filter 13.

Since the red component R and blue component B are obtained at every 2H, in order to obtain a desired color video signal $S_o$, it is necessary that these components R and B be obtained simultaneously and successively as the luminance signal Y. The circuit for this purpose will be described.

The output signal from terminal 3 is applied to a sampling hold circuit 21 which produces a red color signal R (or blue color signal B) and supplies the same through a low pass filter 22 to a simultaneous circit 23 which is formed of a delay line or circuit 24 of 1H and a switching circuit 25. The switching circuit 25 is formed so as to always deliver a red color signal R to its one output terminal and a blue color signal B to its other output terminal. That is, if the switching circuit 25 is shown mechanically, it would be formed as a double-throw, double-contact switch as shown in FIG. 4. In this case, a delayed output signal from the delay circuit 24 and a non-delayed output signal from the low pass filter 22 are supplied to the switching circuit 25 at its desired terminals, respectively. A pair of switches, SW$_a$ and SW$_b$ of switching circuit 25 are changed over by a control signal P$_b$ from signal generator 11 at every 1H.

Thus, the primary color signals R and B (sampled output signals) which are obtained alternately at every 1H are applied simultaneously and then delivered to the output side of the switching circuit 25. The simultaneous primary color signals R and B together with the luminance signal $Y_O$ are fed to an encoder 26 which produces at its output terminal 27 color television signal $S_o$ of the standard system, such as the NTSC system. In this case, encoder 26 and sampling hold circuits 12 and 21 are supplied with desired driving pulses Pc and Pd from generator 11.

In the case where the primary color signals R and B are provided simultaneously and the desired color video signal $S_o$ is produced as described above, the defects caused by the sampling error can be removed, but the following new problem occurs. Since the primary signals are made simultaneously and the sampling output signals at adjacent horizontal lines are used simultaneously, if the output signals at the Nth line (for example, odd line) and the Nth+1 line are taken into consideration, color difference output signals $E_{CR(N)}$ and $E_{CR(N+1)}$ at the respective lines can be expressed by the following equations, respectively.

$$E_{CR(N)} = a\{R_{(N)} - Y_{O(N)}\} + b\{B_{(N-1)} - Y_{O(N)}\} \quad (1)$$

$$E_{CR(N+1)} = a\{R_{(N)} - Y_{O(N+1)}\} + b\{B_{(N+1)} - Y_{O(N+1)}\} \quad (2)$$

where a and b are constants, respectively.

Accordingly, with the color differene signal, each line contains the primary color signal, so that when an image having no vertical correlation is picked up, especially a black-and-white image, the color difference signals expressed do not become "zero". As a result, the picture is reproduced with color, and hence the picture reproduction is deteriorated. In other words, the color difference signal $E_{CR(N)}$ at the Nth line contains also the primary color signal $B_{(N-1)}$ and the color difference signal $E_{CR(N+1)}$ at the N+1 line contains the primary color signal $R_{(N)}$. Thus, when the contents of a picture are different at every line, the primary color signals $B_{(N-1)}$ and $R_{(N)}$ are not always at the correct level.

An example of a solid state color television camera according to the present invention which removes deterioration of the reproduced picture caused by the side band components (without using the optical low pass filter) and also completely eliminates any effect caused by the absence of vertical correlation, will be hereinafter described with reference to FIGS. 6 and 7 where elements which are the same as those of FIG. 4 are marked with the same reference numerals and letters.

In the present invention, the primary color signals are not processed simultaneously, but the color difference signals are processed simultaneously. In this case, it is possible that color difference signals R-Y and B-Y are extracted from the side band components or modulating components, respectively.

An example of the invention shown in FIG. 6 is the case where the color difference signals are extracted from the side band components. In this case, since the color filter 1 shown in FIG. 3 is employed, the relationship between the modulating component and side band component is as shown in FIG. 7. As to the side band component, at an odd line, the luminance signal Yi and primary color signal R are obtained in opposite phase, and similarly at an even line, the luminance Yi and primary color signal B are obtained in opposite phase. Thus, the desired color difference signals R-Y and B-Y can be obtained from the side band components at respective lines in a line sequential manner.

Therefore, in the invention, as shown in FIG. 6, the respective sampled output signals of components Y and R (or B) obtained from the sampling hold circuit 21 are fed to a band pass filter 30 from which a side band component having a desired band (500 KH$_z$ to 1 MH$_z$) with the carrier frequency $f_C$ as its center (shown in FIG. 7 by the dotted line) is derived. In this case, the synchronization of the pulse fed from signal generator 11 to the sampling hold circuit 21 is different from that of FIG. 4 and the driving pulse Pd' which can sample-hold all the signals from every picture element, is fed to the sampling hold circuit 21 from generator 11.

If the side band components from band pass filter 30 are applied to circuit 30 to be made simultaneously, the color difference signals R-Y and B-Y can be obtained from the switching circuit 25 simultaneously. These signals R-Y and B-Y are supplied to demodulators 31 and 32 to be demodulated. The demodulated output signals from demodulators 31 and 32 are fed through low pass filters 33 and 34 to an encoder 26. Although the side band components extracted by band pass filter 30 contain the high band component of the modulating component as shown in FIG. 7, the level of this high band component is very low, so that the high band component can be neglected.

If the color difference output signals $E_{CR(N)}$ and $E_{CR(N+1)}$ obtained by the invention are expressed similar to the equations (1) and (2), the following equations (3) and (4) are obtained, respectively.

$$E_{CR(N)} = a \{R_{(N)} - Y_{O(N)}\} + b \{B_{(N-1)} - Y_{O(N-1)}\} \quad (3)$$

$$E_{CR(N+1)} = a \{R_{(N)} - Y_{O(N)}\} + b \{B_{(N+1)} - Y_{O(N+1)}\} \quad (4)$$

The color difference signals expressed by the equations (3) and (4) also contain the primary color signals, but the above primary color signals contain the luminance signals. Thus, even in the case that there is no vertical correlation, especially where a black-and-white image is picked up, the terms with constants a and b in the equations (3) and (4) become "zero", respectively. As a result, the reproduced picture does not include color as in the prior art.

As described above, according to the present invention, the color difference signals R-Y and B-Y obtained from the image sensing device 10 are made simultaneously, and these simultaneous color difference and luminance signals are used to provide the desired color video signal so that there is achieved the advantage that deterioration of the reproduced picture can be avoided regardless of the use of vertical correlation and without using an optical low pass filter.

With the example of the invention shown in FIG. 6, the respective color difference signals R-Y and B-Y are produced from the side band components, but it is possible that the same color difference signals can be produced from the DC component or base band component.

Figure 8:
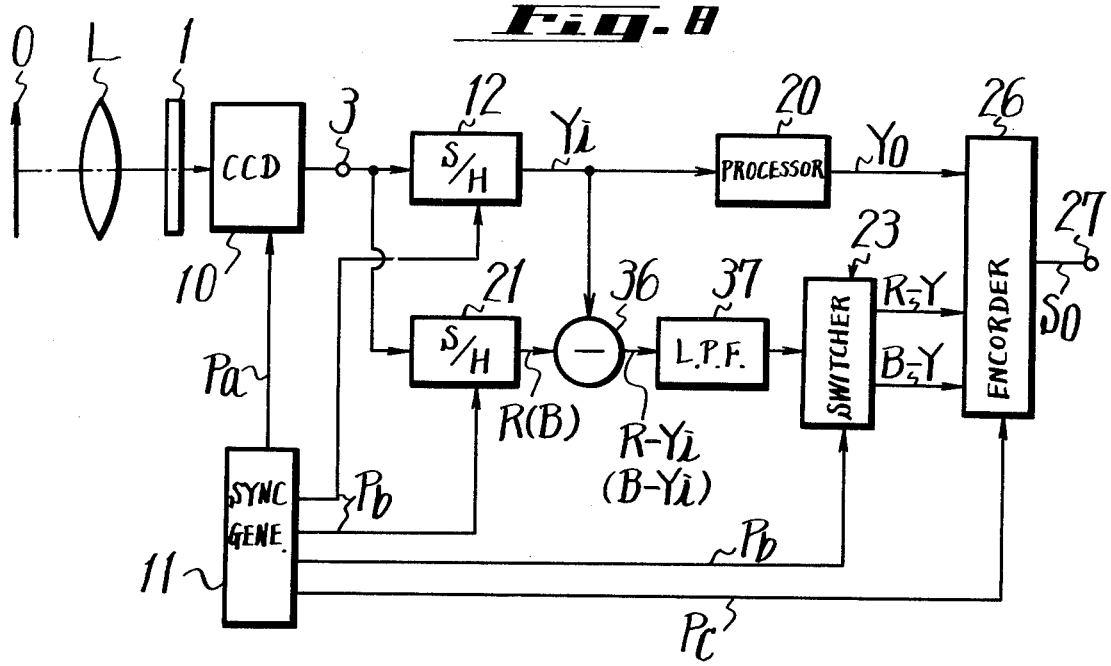

FIG. 8 is a block diagram showing another example of the invention. In this example, luminance signal $Y_i$ and primary color signal R or B obtained independently from sampling hold circuits 12 and 21 are fed to a subtractor circuit 36 to be subjected to a subtraction process. Thus, subtractor circuit 36 produces color difference signal $R-Y_i$ or $B-Y_i$. If this signal is fed through a low pass filter 37 to a simultaneous circuit 23, the color difference signals R-Y and B-Y can be simultaneously obtained therefrom.

Figure 9:
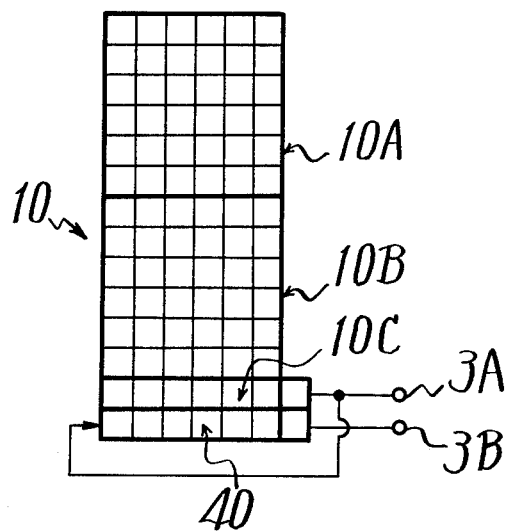
FIG. 9 is a front view showing another example of the solid state image sensing device of the present invention.

In the examples of the invention shown in FIGS. 6 and 8, there are provided two delay circuits 15 and 24, each of which has a 1H delay period, (though they are not shown in FIG. 8), but a single delay circuit will do. In this case, another delay circuit can be provided at the side of the solid state image sensing device 10. That is, as shown in FIG. 9, a delay element 40, whose bit number is selected to be the same as that of the horizontal shift register 10C of the solid state image sensing device 10, is formed on a semiconductor substrate on which the horizontal shift register 10C is formed. An output signal delivered to an output terminal 3A of horizontal shift register 10C is supplied to delay element 40, and the signal is read-out by a clock pulse fed to the horizontal shift register 10C. Thus, an output signal which is delayed by 1H is obtained at an output terminal 3B.

Figure 10:
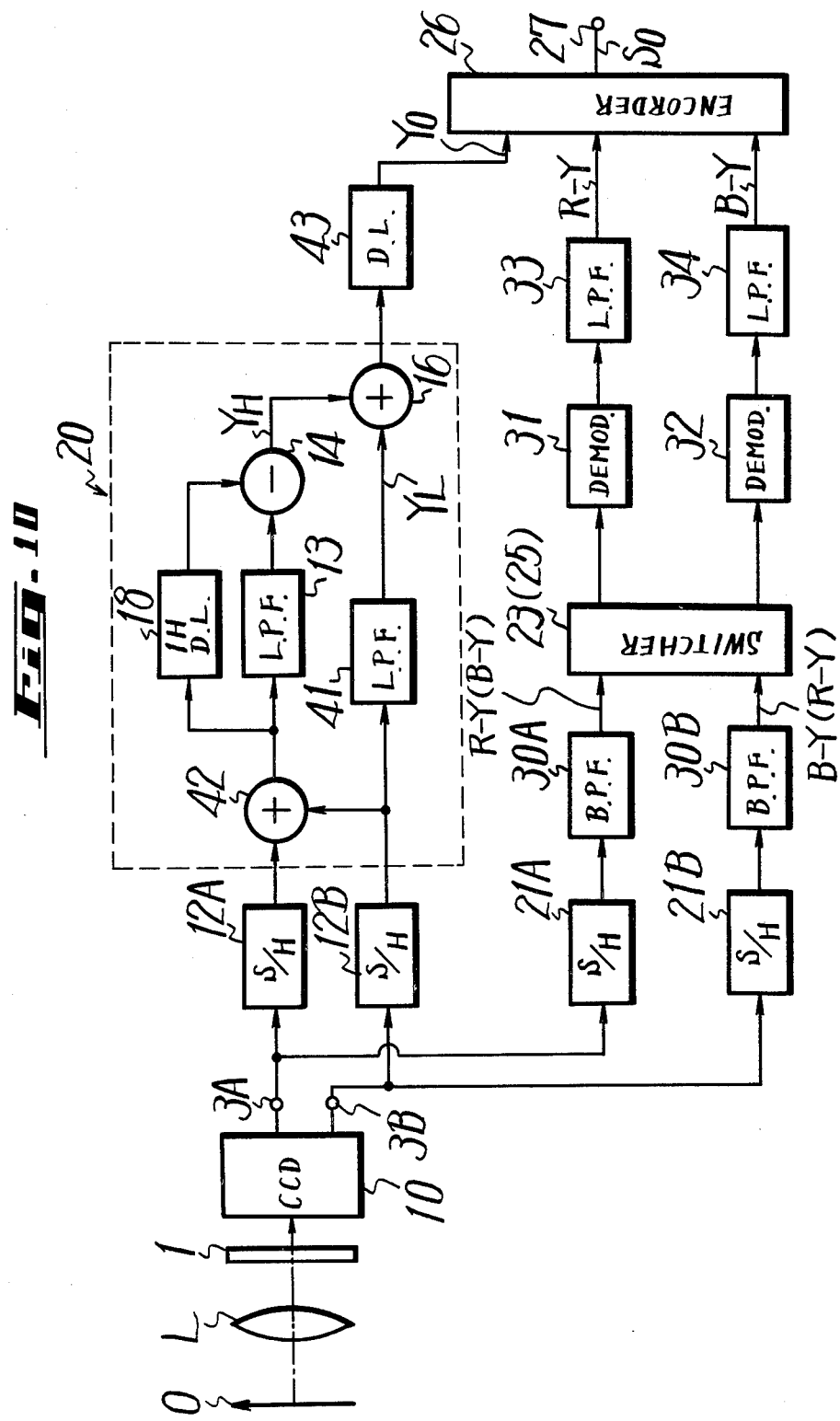

FIG. 10 is a block diagram showing a further example of the invention in which solid state image sensing device 10 is shown in FIG. 9 is employed. In this example, a delay line or circuit 18 with the delay time of 1H is provided in the luminance signal transmission system, but delay element 40 is used in the color difference signal transmission system. For this reason, the output signals at terminals 3A and 3B are fed through sampling hold circuits 21A and 21B to band pass filters 30A and 30B from which line sequential color difference output signals are obtained, respectively, similar to the case of FIG. 6. When the color difference signal R-Y is obtained at terminal 3A, the color difference signal B-Y is obtained at terminal 3B. Thus, if these color difference signals are supplied to simultaneous circuit 23 which is formed of only a switching circuit 25, the color difference signals can be made simultaneous. Other portions of the circuit construction of FIG. 10 is substantially the same as that of FIG. 6.

In the luminance signal transmission system shown in FIG. 10, such a circuit construction is employed that two luminance signals obtained at terminals 3A and 3B are subjected to a correlation process. A newly provided adder 42 is supplied with two luminance signals from sampling hold circuits 12A and 12B to cancel side band components thereof as described previously. In this case, however, if the output signal itself from adder 42 is taken as a luminance signal $Y_O$, the resolution in the vertical direction is deteriorated. Therefore, in this example, the high band component of the output signal from adder 42 is used as the high band component of luminance signal $Y_O$. The low band component of any one of the output signals from terminals 3A and 3B is used as the low band component of luminance signal $Y_O$. In the example of FIG 10, the output signal at terminal 3A is used. In FIG. 12, 41 designates a low pass filter for obtaining the above low band component $Y_L$, which is supplied with the output signal from a sampling hold circuit 12B and which supplied its output signal $Y_L$ to an adder 16. A delay line 43 is used for fine adjustment if necessary. The description of the other circuit elements will be omitted since they are substantially the same as those of FIG. 6.

Figure 11:
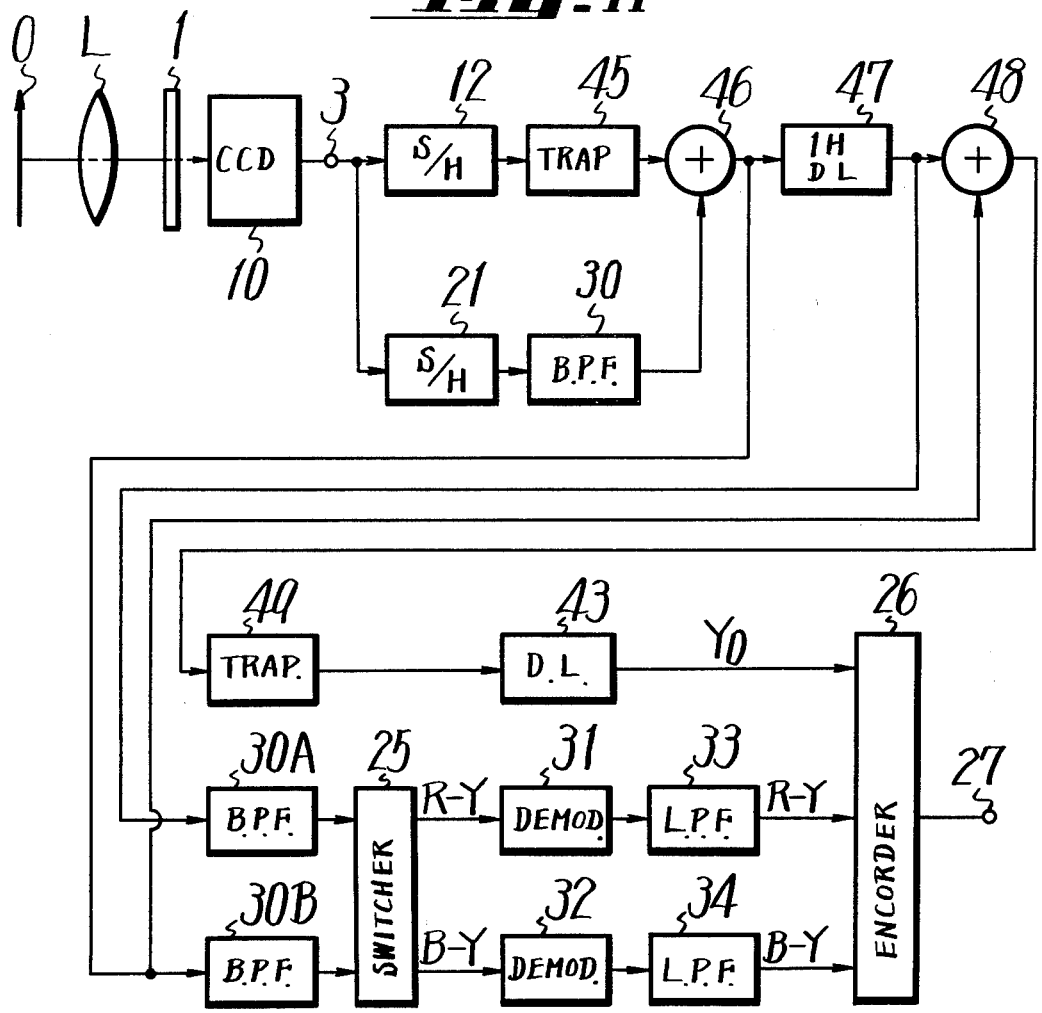

FIG. 11 is a block diagram showing another example of the invention in which an ordinary solid state image sensing device shown in FIG. 5 is used in a way to decrease the number of delay circuits. In the example of FIG. 11, a trap circuit 45 is supplied with the output signal from a sampling hold circuit 12 to produce the luminance signal which has a carrier frequency $f_C$ which is trapped. This luminance signal from trap circuit 45 and the side band component of the primary color signal from band pass filer 30, are supplied to an adder 46 to be added together. The output signal from adder 46 is fed through a delay circuit 47 of 1H to an adder 48 which is also supplied with the output signal from adder 46 directly, so that the side band components are cancelled in adder 48. Since the output signal from adder 48 contains the side band components relating to color signals R or B, a trap circuit 49 is provided at the rear stage of adder 48 so as to remove the above side band components.

As for the color signal transmission system, if a circuit using the output signal itself from adder 46 and that from delay circuit 47 is formed similar to the circuit shown in FIG. 10, the color difference signal can be made simultaneously.

In FIGS. 5 and 9, the CCD of a so-called frame transfer type is shown; it is of course possible that the CCD of a well-known interline type can be used in the present invention.

Further, in the above description the case where only one CCD is used is explained, but the present invention can be applied to such a case where two or more CCDs are employed. FIG. 12 is a schematic block diagram showing a further example of the invention in which two solid state image sensing devices or CCD's 10A and 10B are used. In the example shown in FIG. 12, an image of an object O is projected through a lens system L, a half mirror $H_A$, and a suitable filter 1A to CCD 10A from which only the luminance signal is derived. Also, the image of the object O is projected through the lens system L, half mirror $H_A$, a mirror $H_B$ and a color filer 1B (consisting of strip color filter elements R and B, each of which is elongated in the horizontal direction and arranged alternately in the vertical direction) to the other CCD 10B from which the primary color signals R and B are obtained in line sequence. The output signals obtained at output terminals 3A and 3B are processed by the circuit similar to that shown in FIG. 8 to produce the color difference signals.

It may be apparent that many modifications and variations of the preferred embodiments of the invention could be effected by one skilled in the art without departing from the spirit or scope of the novel concepts set forth herein and therefore the scope of the invention is intended to be described only by the following claims.

We claim as our invention:

1. A solid state television camera having a solid state image sensing device including a plurality of individual light sensing units arranged in both horizontal and vertical rows comprising:
   (a) means for establishing an image path for projecting an image of an object onto said image sensing device;
   (b) a plurality of color filter elements arranged in horizontal rows within said light path, one horizontal row including color filter elements of differing transmissivities with certain ones passing light of a first primary color and certain other successive ones passing light representing all colors, an adjacent horizontal row including color filter elements of differing transmissivities with certain ones passing light of a second primary color and certain other successive ones passing light representing all colors, means for developing carriers representing said primary and all color (luminance) light;
   (c) means for developing a luminance signal from each of said color filter elements;
   (d) means for developing first and second color difference signals from each of said color filter elements in response to portions of respective rows of an image displayed thereon; and
   (e) means for processing said first and second color difference signals as a desired simultaneous color video signal to be mixed with said developed luminance signal.

2. A solid state television camera as claimed in claim 1, wherein said color filter elements are arranged to pass therethrough light representing all color in opposing phase relationship as between successive rows and to pass therethrough said first and second primary color information in opposing phase relationship as between successive rows.

3. A solid state television camera as claimed in claim 1, wherein said first and second primary color compromise red and blue colors.

4. A solid state television camera as claimed in claim 1, wherein the carriers representing said primary color and luminance signals have the same frequency and opposing phases as said image light is projected along a predetermined horizontal row of said image sensing device.

5. A solid state television camera as claimed in claim 1 further comprising a luminance signal processing circuit for avoiding a sampling error of said luminance signal developed from said image sensing device by using vertical correlation in which the developed luminance signals between successive horizontal scanning lines are mixed together.

6. A solid state television camera as claimed in claim 5, wherein high frequency components of said developed luminance signals obtained from successive horizontal scanning lines are mixed together.

* * * * *